United States Patent
Bates et al.

(10) Patent No.: US 8,971,396 B1
(45) Date of Patent: Mar. 3, 2015

(54) WINDOWED-BASED DECISION FEEDBACK EQUALIZER AND DECISION FEEDBACK SEQUENCE ESTIMATOR

(71) Applicant: PMC-Sierra US, Inc., Sunnyvale, CA (US)

(72) Inventors: Stephen Bates, Canmore (CA); Peter John Waldemar Graumann, Calgary (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/973,849

(22) Filed: Aug. 22, 2013

(51) Int. Cl.
*H04L 27/01* (2006.01)
*H04L 25/03* (2006.01)

(52) U.S. Cl.
CPC ................ *H04L 25/03949* (2013.01)
USPC .......... 375/233; 375/232; 375/316; 375/229; 375/340; 375/341; 375/346; 375/348

(58) Field of Classification Search
CPC ............... H04L 2025/03; H04L 2025/03006; H04L 2025/03433; H04L 2025/03439; H04L 2025/03471; H04L 2025/03477; H04L 2025/03484; H04L 2025/0349; H04L 2025/03496; H04L 2025/03503
USPC ......... 375/232, 233, 316, 229, 340, 341, 346, 375/348
See application file for complete search history.

(56) References Cited

U.S. PATENT DOCUMENTS

| 8,259,787 | B2 | 9/2012 | Agazzi et al. | |
|---|---|---|---|---|
| 8,638,886 | B2 * | 1/2014 | He | 375/341 |
| 8,675,723 | B2 * | 3/2014 | Kim et al. | 375/232 |
| 2009/0268804 | A1 * | 10/2009 | Kawashima et al. | 375/233 |
| 2014/0146867 | A1 * | 5/2014 | Shvydun et al. | 375/233 |

FOREIGN PATENT DOCUMENTS

| EP | 1043875 | 10/2000 |
|---|---|---|
| EP | 1237340 | 9/2002 |

OTHER PUBLICATIONS

Belfiore et al., "Decision Feedback Equalization", Proceedings of the IEEE, Aug. 1979, vol. 67, No. 8, pp. 1143-1156.
Duel-Hallen et al., "Delayed Decision Feedback Sequence Estimation", IEEE Transactions on Communications, May 1989, vol. 37, No. 5, pp. 428-436.
Wang et al., "DFE architectures for high-speed backplane applications", Electronic Letters, Sep. 29, 2005, vol. 41., No. 20, 2 pages.

(Continued)

*Primary Examiner* — Siu Lee
(74) *Attorney, Agent, or Firm* — Dennis R. Haszko

(57) ABSTRACT

A method and system are provided for performing Decision Feedback Equalization (DFE) and Decision Feedback Sequence Estimation (DFSE) in high-throughput applications that are not latency critical. In an embodiment, overlapping blocks of samples are used to allow for the parallelization of the computation and the breaking of the critical path. In addition, the overlap of the windows addresses issues associated with performance loss due to what is termed "ramp-up" and "ramp-down" BER loss.

16 Claims, 10 Drawing Sheets

(56) References Cited

OTHER PUBLICATIONS

Benvenuto et al., "Block iterative DFE for single carrier modulation", Electronic Letters, Sep. 12, 2002, vol. 38, Issue 19, pp. 1144-1145.

IEEE P802.3bj/D1.3 "Draft Standard for Ethernet Amendment X: Physical Layer Specifications and Management Parameters for 100 Gb/s Operation Over Backplanes and Copper Cables", http://www.ieee802.org/3/bj/index.html, Dec. 17, 2012, pp. 1-318.

* cited by examiner

US 8,971,396 B1

WINDOWED-BASED DECISION FEEDBACK EQUALIZER AND DECISION FEEDBACK SEQUENCE ESTIMATOR

FIELD

The present disclosure relates to decision feedback equalization, including but not limited to high performance windowed decision feedback equalizers in communication systems.

BACKGROUND

Decision Feedback Equalizers (DFEs) and Decision Feedback Sequence Estimators (DFSEs) are circuits commonly used in communication systems to mitigate the impact of Inter-Symbol Interference (ISI) on the performance of the system. As such these circuits have been used in communication circuits for a number of decades.

The DFSE equalizer uses trellis decoding to assist in the compensation of the received signal. The performance obtained by a DFSE is generally between that of a DFE and a Maximum Likelihood Sequence Estimator (MLSE) based system.

However as communication circuits continue to operate at faster and faster speeds the ability to implement DFEs and MLSEs using classical architectures is becoming increasingly difficult due to the critical path associated with these circuits. As such a need exists to develop novel ways to implement these types of circuits at high speeds.

Implementing ISI mitigation circuits in high-speed communications systems provides benefits in terms of system performance but is problematic in terms of circuit design. The inherent feedback path delay of classical DFE and DFSE circuits is becoming increasingly more challenging as data rates increase.

One approach to high speed operation is to separate critical path computations into first and second portions. The first portion includes computations performed in a DFE and a Multiple DFE element. The second portion includes computations performed in a Viterbi decoder. A set of tail coefficients is generated in the DFE and used to decode an input signal.

Another approach to improved performance uses two parallel paths. A first path includes windowing and a second path does not. The first path uses a DFE to reduce inter-bin-interference introduced by the windowing. Bin select logic is used to detect the 'best' of the two parallel paths. Techniques have been developed to provide design procedures for windows. One technique is applied to subsets of sub-channels and the shape of the window is adapted to the observed conditions.

Improvements in the speed performance of feedback equalizers are desirable. The speed improvement should not come at the expense of parameters such as power dissipation.

BRIEF DESCRIPTION OF THE DRAWINGS

Embodiments of the present disclosure will now be described, by way of example only, with reference to the attached Figures.

DETAILED DESCRIPTION

Figure 1:
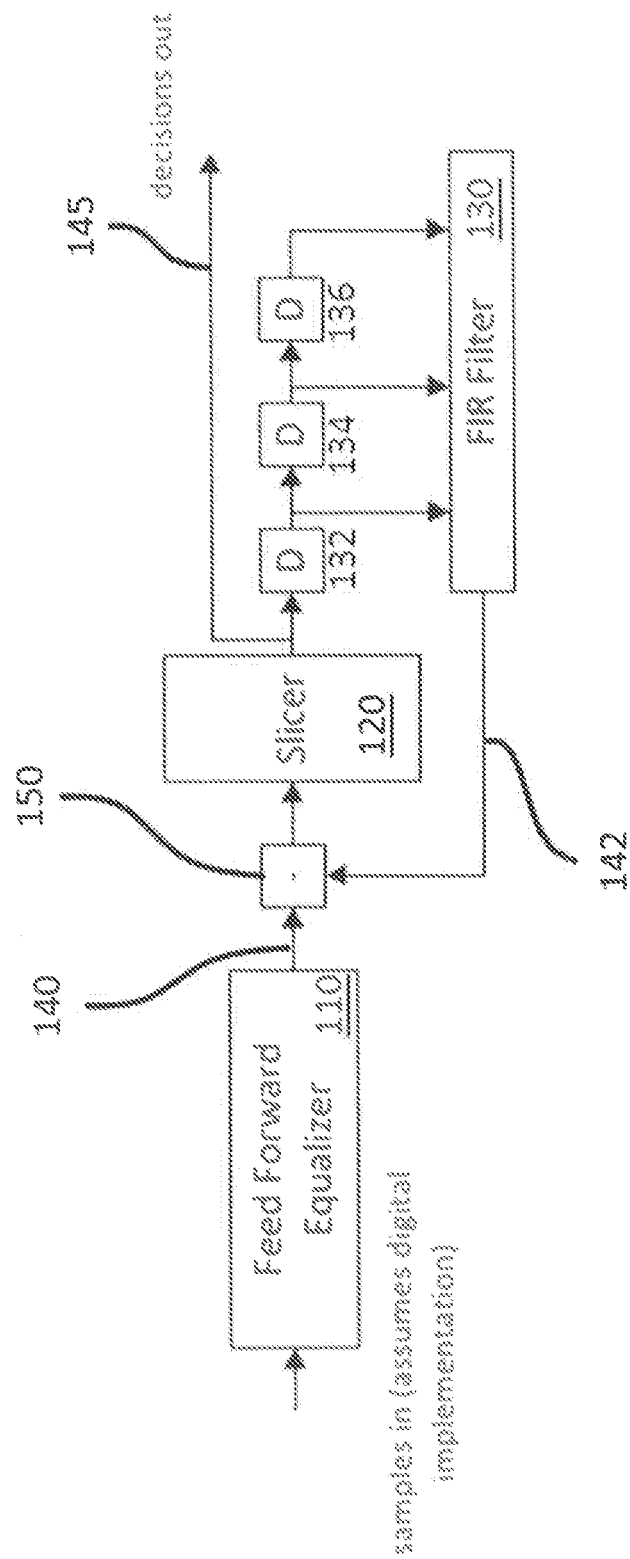
FIG. 1 illustrates a classical decision feedback equalizer.

A method and system are provided for performing Decision Feedback Equalization (DFE) and Decision Feedback Sequence Estimation (DFSE) in high-throughput applications that are not latency critical. In a feedback equalizer the delay in the feedback path is often the critical path in terms of high-throughput applications. In an embodiment, overlapping blocks of samples are used to allow for the parallelization of the computation and the breaking of the critical path. In addition, the overlap of the blocks (or windows) addresses issues associated with performance loss due to what is termed "ramp-up" and "ramp-down" bit error rate (BER) loss in DFE and DFSE implementations. Embodiments of the present disclosure provide a method of implementing DFEs and DFSEs for high speed applications based on the block-based approach. The block-based approach is improved upon by using overlapping-blocks of symbols. In some embodiments the symbols are samples. The architecture presented in embodiments of the present disclosure breaks the critical path and hence makes the implementation of these circuits easier. It does this in such a way that the performance of the system is maintained. Those skilled in the art will understand that a circuit can be implemented as a module, or be part of a module.

In an embodiment a method for feedback equalization is achieved by receiving an input signal including first, second, third and fourth sequential symbols. First and second overlapping blocks are generated each having a data portion and a padding portion. The data portion of the first overlapping block comprises the first and second symbols. The data portion of the second overlapping block comprises the third and fourth symbols, and the padding portion of the second overlapping block comprises the second symbol. The method then comprises: applying the first and second overlapping blocks to inputs of first and second parallel feedback equalizers, respectively; generating, at the first and second parallel feedback equalizers, first and second intermediate blocks having a size corresponding to the first and second overlapping blocks; producing first and second non-overlapping output signal blocks based on the intermediate signal blocks, the first and second non-overlapping output signal blocks each having a size corresponding to the data portion; and combining the output signal blocks into an output signal.

An embodiment comprises applying the overlapping blocks to the parallel feedback equalizers at substantially the same time. An alternative embodiment comprises applying the overlapping blocks to the parallel feedback equalizers one clock cycle apart.

A further embodiment of the feedback equalization comprises estimating the first overlapping block padding portion contents and the second overlapping block padding portion contents based upon the input signal.

In an alternative embodiment, a RUIC is employed in the method for feedback equalization. The method comprises applying the received input signal to the RUIC; generating, at the RUIC, an estimate of the first overlapping block padding portion contents and the second overlapping block padding portion contents; and applying the estimate of the first overlapping block padding portion contents and the second overlapping block padding portion contents to the first and second parallel feedback equalizers respectively.

The padding portion of the second overlapping block may comprise the first symbol.

In another embodiment, the method comprises: receiving a degraded signal from a communication channel; applying the degraded signal to a feed forward equalizer; generating the input signal by the feed forward equalizer, the feedforward equalizer having a transfer function inversely proportional to the attenuation of the communication channel.

In accordance with another aspect of the present disclosure, there is provided a feedback equalizer comprising a capture circuit, first and second load circuits, first and second parallel feedback equalizers, first and second collect circuits and a merge circuit. The capture circuit is configured to receive an input signal and separate from the input signal a first and a second overlapping block, the first and second overlapping blocks each having a padding portion and a data portion. The first load circuit is configured to apply the first overlapping block to a first parallel feedback equalizer. The second load circuit is configured to apply the second overlapping block to a second parallel feedback equalizer. The first parallel feedback equalizer generates a first intermediate block having a size corresponding to the first overlapping block. The second parallel feedback equalizer generates a second intermediate block having a size corresponding to the second overlapping block. The first collect circuit is configured to produce a first non-overlapping output signal block from the first intermediate block, the first non-overlapping output signal block having a size corresponding to the data portion of the first non-overlapping block. The second collect circuit is configured to produce a second non-overlapping output signal block from the second intermediate block, the second non-overlapping output signal block having a size corresponding to the data portion of the second non-overlapping block. The merge circuit is configured to combine the first and second non-overlapping blocks into an output signal.

In some embodiments, the feedback equalizer further comprises a timing circuit configured to apply the overlapping blocks to the parallel feedback equalizers at substantially the same time. Alternative embodiments comprise a timing circuit configured to apply the overlapping blocks to the parallel feedback equalizers one clock cycle apart.

Embodiments of the feedback equalizer may further comprise a ramp up improvement circuit configured to receive the input signal, generate an improvement signal and apply the improvement signal to the parallel feedback equalizers. In an embodiment, the first and second parallel equalizers and the ramp up improvement circuit all have the same transfer function. The ramp up improvement circuit may be an infinite impulse response filter.

The parallel feedback equalizers in one embodiment are decision feedback equalizers. In other embodiments of the feedback equalizer the parallel feedback equalizers are decision feedback sequence estimators.

The size of the second overlapping block may be equal to the size of the first overlapping block. The size of the second data portion may equal to the size of the first data portion.

A further embodiment of the feedback equalizer comprises a copper based communication network interface for coupling to a copper based communication network. An alternative embodiment of the feedback equalizer comprises an optical based communication network interface for coupling to an optical based communication network. The feedback equalizer may further comprise a backplane system interface for coupling to a backplane system.

In accordance with another embodiment of the present disclosure, there is provided a method for feedback equalization comprising: receiving an input signal including first, second, third and fourth sequential symbols; generating first and second overlapping blocks each having a data portion and a padding portion, the data portion of the first overlapping block comprising the first and second symbols, the data portion of the second overlapping block comprising the third and fourth symbols, the padding portion of the second overlapping block comprising the second symbol; applying the first and second overlapping blocks to inputs of first and second parallel feedback equalizers, respectively.

In accordance with a further embodiment of the present disclosure there is provided a method for feedback equalization comprising: applying first and second overlapping blocks to inputs of first and second parallel feedback equalizers, respectively; generating, at the first and second parallel feedback equalizers, first and second intermediate blocks having a size corresponding to the first and second overlapping blocks; producing first and second non-overlapping output signal blocks based on the intermediate signal blocks, the first and second non-overlapping output signal blocks each having a size corresponding to a data portion; and combining the output signal blocks into an output signal.

In accordance with an embodiment of the present disclosure there is provided a feedback equalizer comprising a capture circuit, first and second load circuits and first and second parallel feedback equalizers. The capture circuit is configured to receive an input signal and separate from the input signal first and second overlapping blocks, the first and second overlapping blocks each having a padding portion and a data portion. A first load circuit is configured to apply the first overlapping block to a first parallel feedback equalizer. A second load circuit is configured to apply the second overlapping block to a second parallel feedback equalizer. The first parallel feedback equalizer generates a first intermediate block having a size corresponding to the first overlapping block. The second parallel feedback equalizer generates a second intermediate block having a size corresponding to the second overlapping block.

In accordance with another embodiment of the present disclosure there is provided a feedback equalizer comprising first and second parallel feedback equalizers, first and second collect circuits and a merge circuit. The first parallel feedback equalizer generates a first intermediate block having a size corresponding to a first overlapping block. The second parallel feedback equalizer generates a second intermediate block having a size corresponding to a second overlapping block.

The first collect circuit is configured to produce a first non-overlapping output signal block from the first intermediate block, the first non-overlapping output signal block having a size corresponding to a data portion of the first non-overlapping block. The second collect circuit is configured to produce a second non-overlapping output signal block from the second intermediate block, the second non-overlapping output signal block having a size corresponding to a data portion of the second non-overlapping block. The merge circuit is configured to combine the first and second non-overlapping blocks into an output signal.

A classical Decision Feedback Equalizer is shown in FIG. 1. In such an implementation, equalized samples 140 are passed from a feed forward equalizer 110 into a slicer 120 to generate symbols 145 that are estimates of a transmitted sequence. These symbols 145 form the output of the DFE but also form the data input component of a feedback filter (or FIR filter) 130 used to remove the inter-symbol interference (ISI). The output 142 of the feedback filter 130 represents previous symbol decisions, and in some embodiments the feedback output is a weighted combination of previous symbol decisions. The feedback filter output 142 represents ISI present on the equalizer output signal 140. A subtractor 150 subtracts the output of the feedback filter 142 from the output of the equalizer 140, such that improved decisions are made because the input to the slicer 120 now represents an equalised signal with ideally zero ISI. In some embodiments the feedback filter 130 is designed to allow reduction of both ISI and noise present at the equalizer output 140.

One issue with the classical implementation of FIG. 1 is that the delay of the filter 130 has to be within a single Unit Interval (UI) of time, for example within one clock cycle. At high data rates, implementing a filter with a one UI delay is very difficult to achieve. For example in a 25 Gb/s system the UI is $1/(25 \times 10^9) = 40$ ps which is a challenge to achieve in integrated circuitry. Even using the smallest CMOS geometries available today, it is difficult to achieve the critical path requirement for high speed applications. A DFSE equalizer also has issues similar to the DFE equalizer of FIG. 1 at high data rates.

In general, a parallel architecture can be used to separate an input signal at a high rate into several smaller signals (or blocks) at lower rates. These multiple signals are processed by separate paths, and then combined into a single output signal at the same high rate as the input signal. A problem with this approach is that circuitry within the paths can affect the beginning and end of the signal blocks such that when they are combined there are errors in the output signal.

An embodiment of the present disclosure is based on an overlapping block approach whereby overlapping-blocks of symbols are grouped together and passed into multiple engines that operate on these blocks (or windows) to generate output decisions at the same rate at which input symbols arrive.

Figure 2:
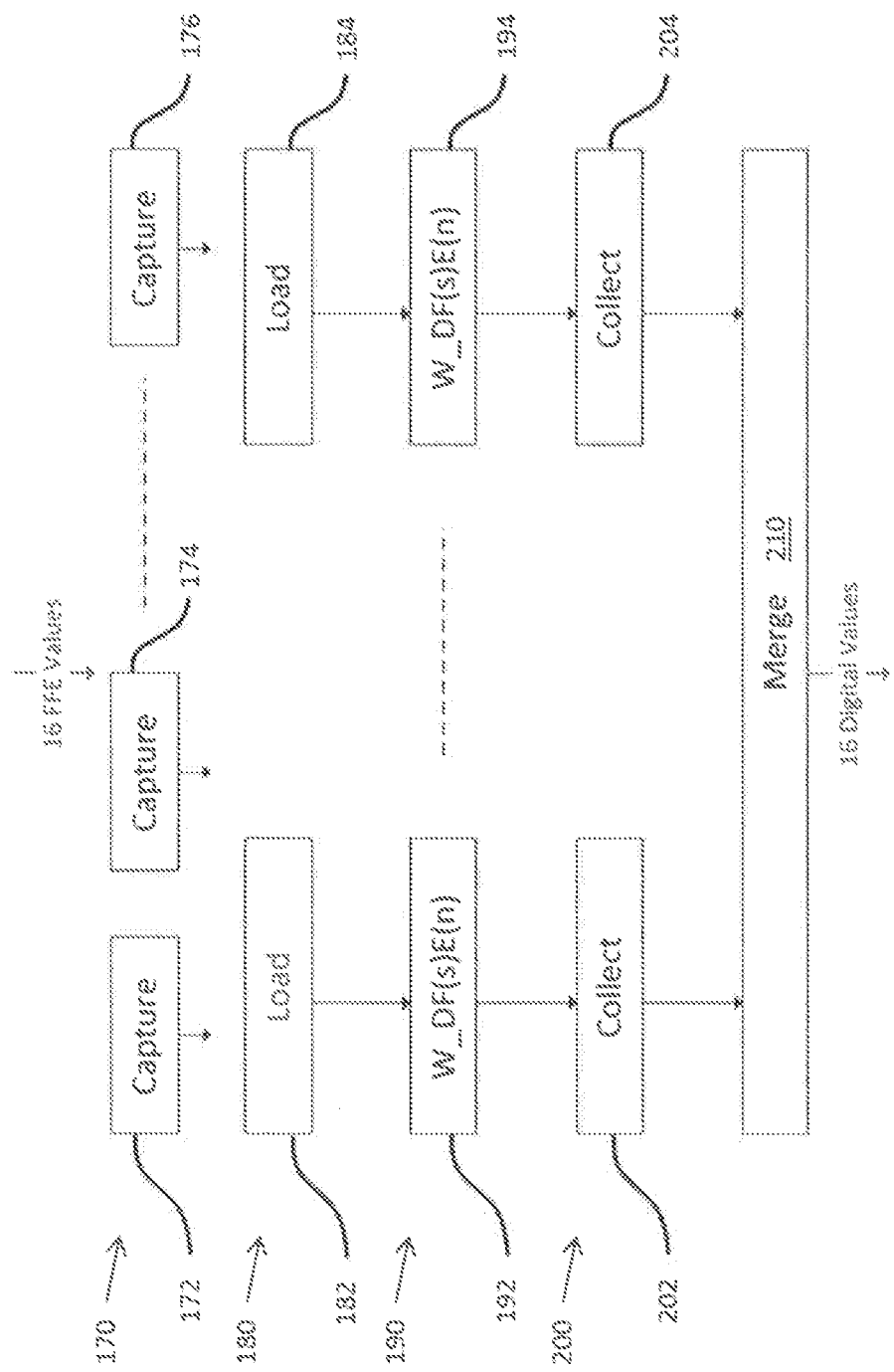
FIG. 2 illustrates a windowed DFE according to an embodiment of the present disclosure including windowed DFE engines and associated capture, load, collect and merge circuits.

FIG. 2 illustrates a windowed DFE according to an embodiment of the present disclosure including windowed DFE engines 190, ..., 194 and associated capture circuits 170, 172, ... 174, load circuits 180, ... 184, collect circuits 200, ... 204 and merge circuit 210. In FIG. 2 capture circuit 176, load circuit 184, wDFE engine 194, and collect circuit 204 all represent the Nth instance of their respective circuit. In an embodiment the engines 190, ... 194 are wDFE engines (for DFEs). In an alternative embodiment the engines 190, ... 194 are wDFSE engines (for DFSEs). The details of construction of such computation engines are known to one of ordinary skill in the art.

The capture circuits 170, 172, ... 174 are based on the baud rate of the system and each capture a group of symbols, one after the other. The capture circuits 170, 172 ... 174 each capture input symbols in sequence in a round-robin fashion, so that when the last capture circuit 176 has captured data block of symbols, the first capture circuit 170 is ready to capture again. The manner in which symbols that are captured are overlapped will be described in relation to FIG. 3. The load circuits 180, ... 184 can be implemented using a multi-plexor, for example. The collect circuits 200, ... 204 take the outputs of the DFE engines 190, ... 194 and organize the symbols into a size corresponding to non-overlapping data portions (to be described in relation to FIG. 3) of the group of symbols captured by the capture circuits 170, 172 ... 174. The merge circuit 210 then merges the collected symbols in a round-robin form to get the non-overlapping symbols produced by the collect circuits 200, ... 204 into a continuous stream. The output of the merge circuit 210 is clocked at the same rate as the input to the capture circuits 170, 172 ... 174.

In an example embodiment, the engines 190, ..., 194 are operating at a fraction of the clock rate at which the input to the capture circuits 170, 172 ... 174 and the output from the merge circuit 210 are operating. In an example embodiment, the exact number of wDFE engines is chosen to achieve the target throughput as a function of the main symbol size, the ramp-up and ramp-down and the clock speed of the circuit.

Figure 3:
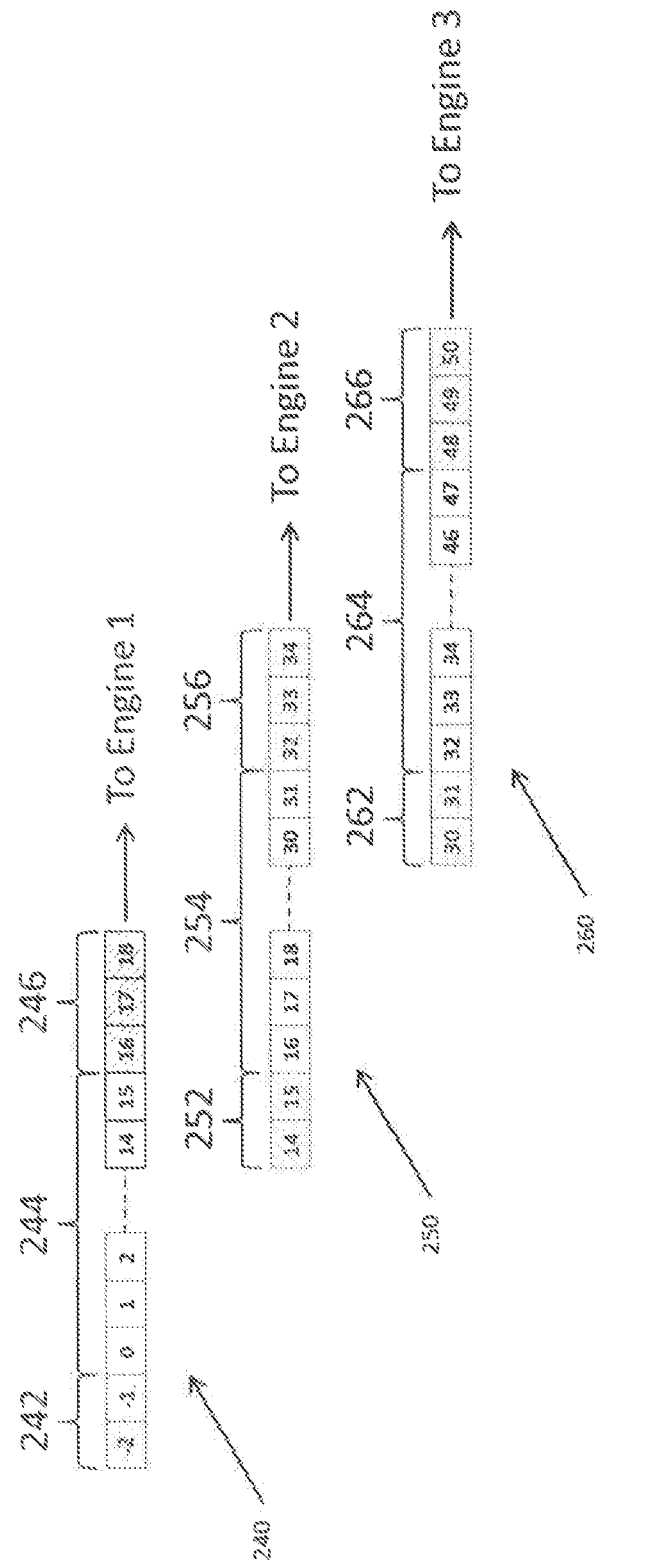
FIG. 3 illustrates symbol passing in a system having multiple DFE engines according to an embodiment of the present disclosure.

FIG. 3 illustrates symbol passing in a system having multiple DFE engines according to an embodiment of the present disclosure. FIG. 3 illustrates how the first 50 symbols of the input signal, split up into streams 240, 250 and 260, are passed into an embodiment comprising three wDFE engines. In the example embodiment of FIG. 3, the ramp-up portion 242, 252 and 262 is 2 symbols, the ramp-down portion 246, 256 and 266 is 3 symbols and the data portion 244, 254 and 264 is 16 symbols. This means that 16+2+3=21 symbols are passed into each engine and 16 symbols are output from each engine.

In the embodiment of FIG. 3, the Engine 2 ramp-up padding portion 252, containing symbols 14 and 15 based on the symbols 14 and 15 within Engine 1 data portion 244. In another embodiment, contents of the ramp-up padding portion are different from contents of a previous data portion. The collect circuit 200 takes the outputs of the DFE engines 190, ... 194 and organize the symbols into a size corresponding to non-overlapping data portions (to be described in relation to FIG. 3), 244, 254 and 264, of the group of symbols captured by the capture circuits 170. In the embodiment of FIG. 3, the input to Engine 1 consists of symbols -2 to 18, the main data symbols being 0 to 15.

Returning to FIG. 2, the capture circuit 170 is responsible for amalgamating the 21 symbols (242, 244, and 246) and the load circuit 180 then loads these 21 symbols into the engine 190. After processing by the engine 190 the 16 main data symbols 244 are output from the engine 190 and applied to a collect circuit 200 circuit. A merge 210 circuit then constructs the output bit-stream. In an example embodiment, the first and second overlapping blocks are applied at substantially the same time, or are applied one clock cycle apart, for example using a timing circuit.

Figure 4:
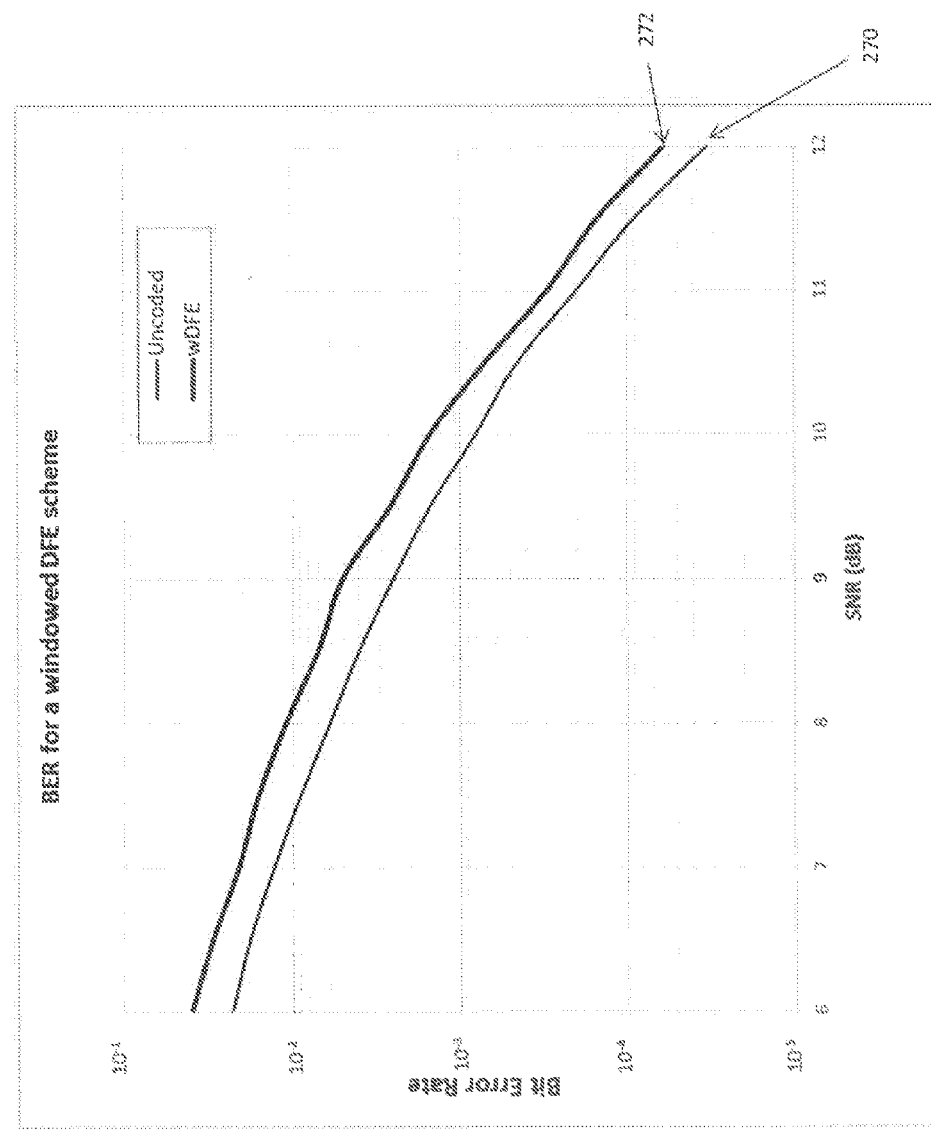
FIG. 4 is a graph illustrating performance of a feedback equalizer according to an embodiment of the present disclosure.

FIG. 4 is a graph illustrating performance of a wDFE according to an embodiment of the present disclosure. A first performance curve 270 illustrates uncoded performance, while a second performance curve 272 illustrates performance using a windowed DFE implementation according to an embodiment of the present disclosure. The example results shown in FIG. 4 are from a computer simulation. In this simulation a Ramp Up of 8 symbols is used and the largest tap weighting in the DFE is 0.75. As the signal to noise ratio (SNR) increases, the loss of the wDFE performance with respect to uncoded performance diminishes. The reason that the wDFE system does not perform as well as the uncoded curve is that the DFE introduces an additional error component called error propagation. Error propagation occurs when an error in the DFE feeds back into the datapath and causes subsequent errors to occur. Error propagation is a well understood characteristic of all DFEs.

Typical high-speed systems target a BER much lower than is shown in FIG. 4. For example the 802.3bj backplane Ethernet standard defines a BER of $1 \times 10^{-12}$ or better.

Figure 5:
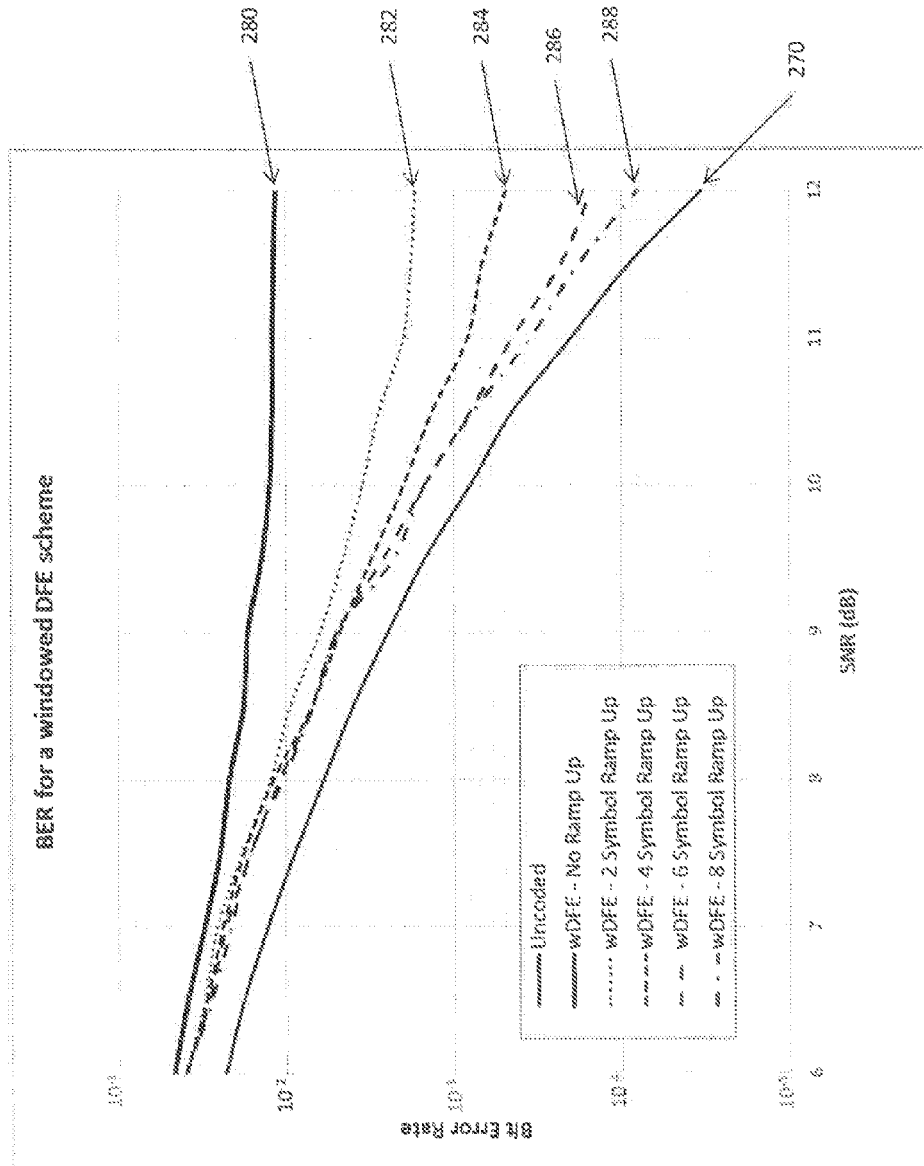
FIG. 5 is a graph illustrating performance of a feedback equalizer according to an embodiment of the present disclosure.

One challenge facing implementation of the wDFE is the issue of ramp-up BER and this is illustrated in FIG. 5, which is a graph illustrating performance of a feedback equalizer according to an embodiment of the present disclosure. Ramp-up is a phenomenon whereby the first few decisions from a wDFE have a much higher BER than later decisions. If the ramp-up is chosen to be too short it can have a material impact on the BER performance of the wDFE. At the same time, it is desirable to minimize the number of ramp-up symbols to reduce the power and area of the wDFE engines.

In FIG. 5 the BER is plotted against SNR for an uncoded implementation 270 as well as a range of ramp-up choices, including: wDFE with no ramp up 280; wDFE with 2 symbol ramp up 282; wDFE with 4 symbol ramp up 284; wDFE with 6 symbol ramp up 286; and wDFE with 8 symbol ramp up 288. It is clear that the no ramp-up case 280 has serious performance issues and the BER never drops below $1 \times 10^{-2}$. As the ramp-up is increased, the impact on performance diminishes; a Ramp-Up of 8 is needed to remove any effect, and the ramp-up required for a $1 \times 10^{-12}$ BER will be even higher. The ramp-up BER is apparent for those cases where the ramp-up is chosen to be less than 8 symbols in this configuration. It is worth noting that the ramp-up increases the power and area of the wDFE solution because it increases the overlap between the windows (see FIG. 3).

Figure 6:
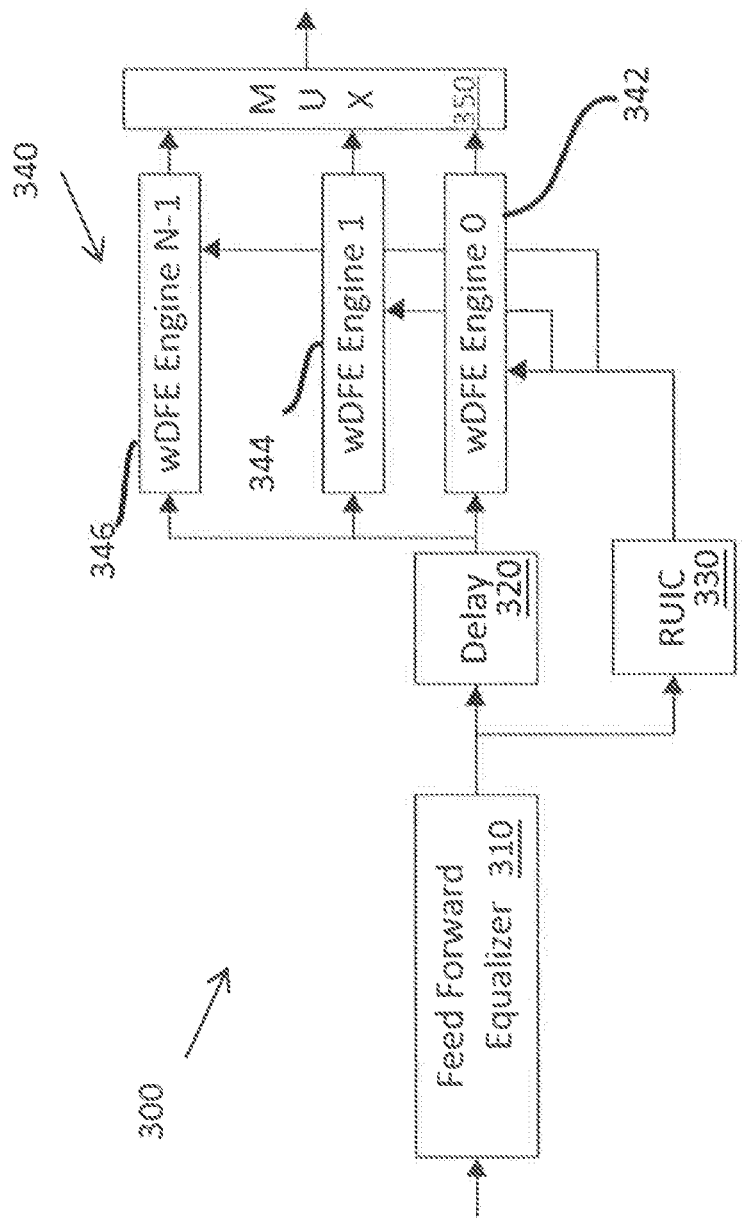
FIG. 6 illustrates a wDFE architecture incorporating a ramp-up improvement circuit according to an embodiment of the present disclosure.

FIG. 6 illustrates a wDFE architecture 300 incorporating a ramp-up improvement circuit (RUIC) 330 according to an embodiment of the present disclosure. In an embodiment, the RUIC 330 is configured to receive the input signal to the windowed DFE, generate an improvement signal and apply the improvement signal to the parallel feedback equalizers, in order to reduce the amount of ramp-up required. The RUIC 330 enables a smaller ramp-up to be used, while obtaining performance typically associated with a larger ramp-up. The functionality of the RUIC 330 can be described in relation to a mathematical transform, which can be represented in the form of a z-domain transform where X(z) is the output of a feedforward equalizer 310. Such a representation is provided by Equation 1.

$$Y(z)=X(z)/(1+DFE(z)) \qquad \text{Equation 1}$$

where Y(z) is the output of the RUIC 330; X(z) is the output of the equalizer 310; and DFE(z) is the transfer function of the DFE 340. The RUIC 330 can be used in the DFE implementation of FIG. 6, and alternatively in a DFSE implementation in which the DFEs 340, 342 and 344 are be replaced by corresponding DFSEs.

The RUIC 330 allows the ramp-up length to be shortened. It is clear that without a RUIC a ramp-up of about 10 symbols is required to ensure no loss in performance, however with the RUIC this ramp-up can be shortened to 5 symbols with no loss in performance.

In an embodiment, the RUIC 330 works by attempting to estimate the ramp-up symbols rather than assigning them a random value. In this particular instance a simple IIR filter is used to estimate the ramp-up symbols. The coefficients of the IIR filter in one embodiment would correspond to those in the DFE component of the wDFE and these estimates can be computed in advance to minimize the additional power and area of the RUIC.

Figure 7:
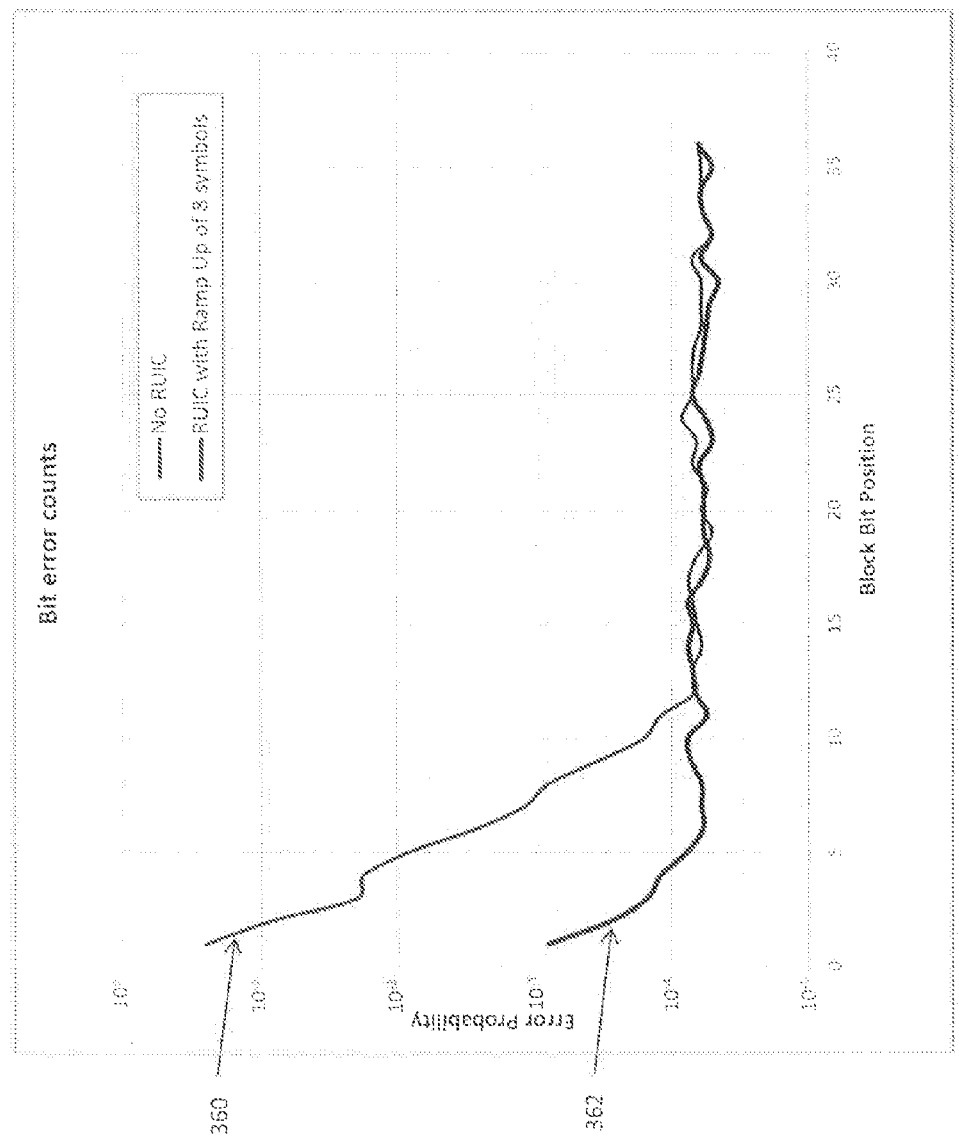
FIG. 7 is a graph illustrating performance of a feedback equalizer according to an embodiment of the present disclosure.

FIG. 7 is a graph illustrating performance of a feedback equalizer according to an embodiment of the present disclosure, and illustrating the performance difference with and without the RUIC of FIG. 6. In FIG. 7, a performance curve 360 with no RUIC is contrasted with a performance curve 362 with an RUIC having a ramp-up for 8 symbols. Given that a ramp-up is required to achieve adequate BER performance but increases the power and area of the wDFE it is desirable to keep the ramp-up as short as possible. One novel feature of one embodiment is that the RUIC, which can be based on an IIR filter, can be used to reduce the ramp-up requirements of both the wDFE and wDFSE based engine implementations. An example of the benefits of this circuit can be seen in FIG. 7.

Figure 8:
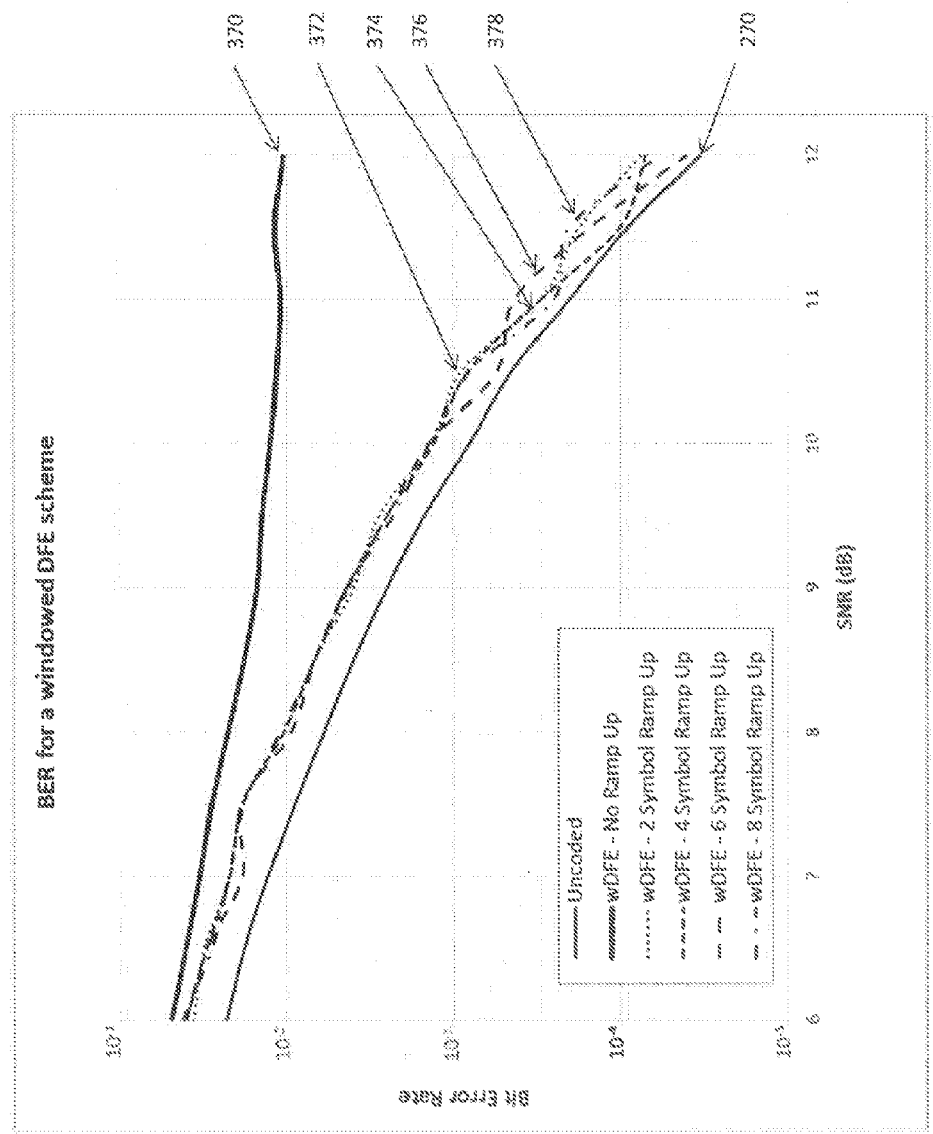
FIG. 8 is a graph illustrating performance of a wDFE architecture incorporating a ramp-up improvement circuit according to an embodiment of the present disclosure.

FIG. 8 is a graph illustrating performance of a wDFE architecture incorporating a ramp-up improvement circuit according to an embodiment of the present disclosure. To illustrate the benefit of the RUIC, the system that generated the results of FIG. 5 was used, but with a RUIC incorporated for each of the cases where the ramp-up is greater than zero. The results are given in FIG. 8, in which curves 370, 372, 374, 376 and 378 illustrate improvements with respect to corresponding curves 280, 282, 284, 286 and 288 in FIG. 5. It is clear that the performance of the wDFE is greatly improved with the RUIC enabled.

Figure 9:
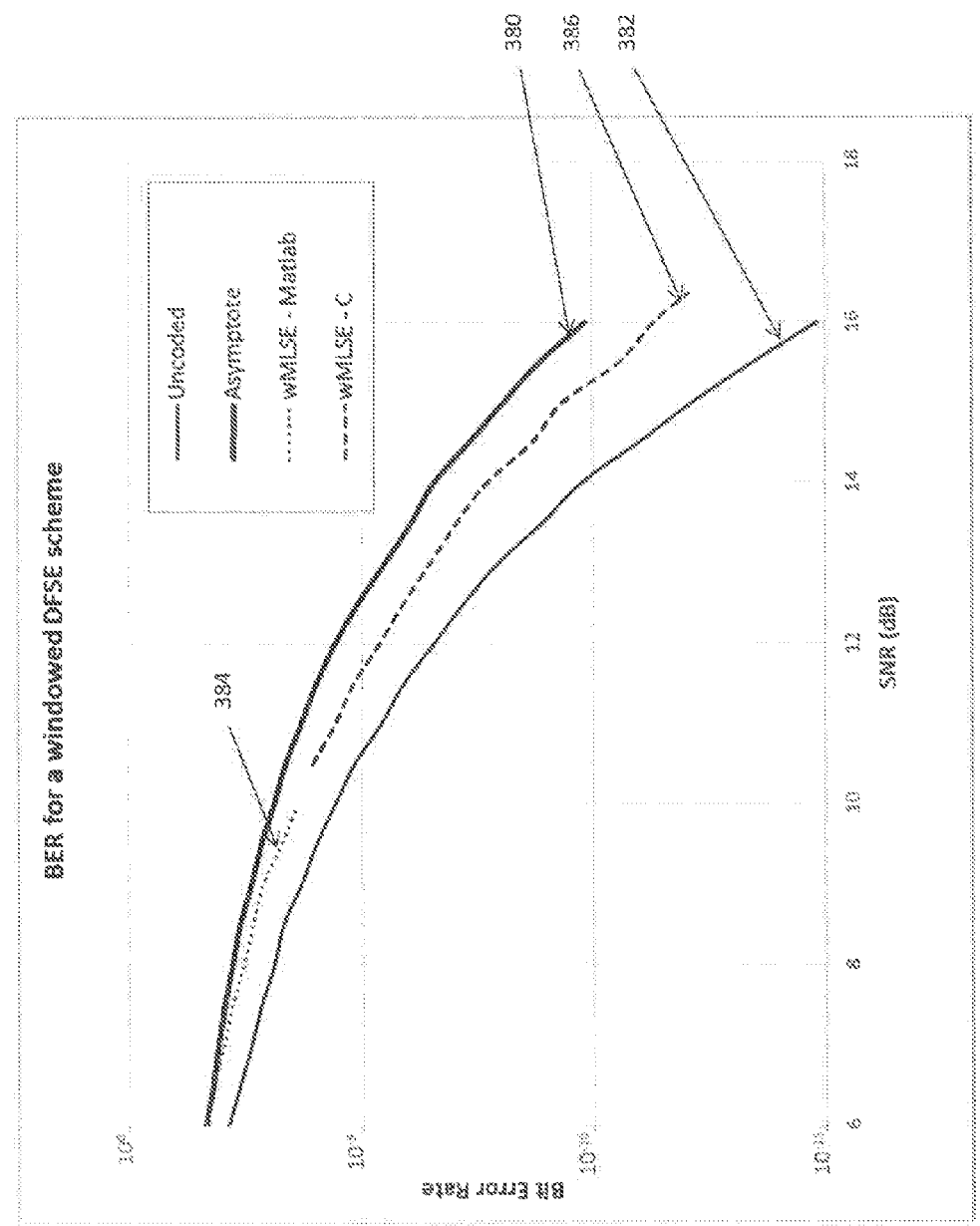
FIG. 9 is a graph illustrating performance of a windowed DFSE according to an embodiment of the present disclosure including windowed MLSE engines and a ramp-up improvement circuit according to an embodiment of the present disclosure.

FIG. 9 is a graph illustrating performance of a windowed DFSE according to an embodiment of the present disclosure including windowed DFSE engines and a ramp-up improvement circuit according to an embodiment of the present disclosure. FIG. 9 provides simulation results for an implementation using the wDFSE circuit. Results are presented down to a very low BER ($1 \times 10^{-12}$). These results include the ramp-up mitigation circuits discussed above. The wDFSE approach performs better than the uncoded scheme because it takes advantage of the information contained in the first post-cursor tap when making decisions on the symbols in the receiver. The asymptote is the performance that could be obtained in an ideal Maximum Likelihood implementation. However implementing such a receiver would typically be prohibitive in terms of power and area.

Figure 10:
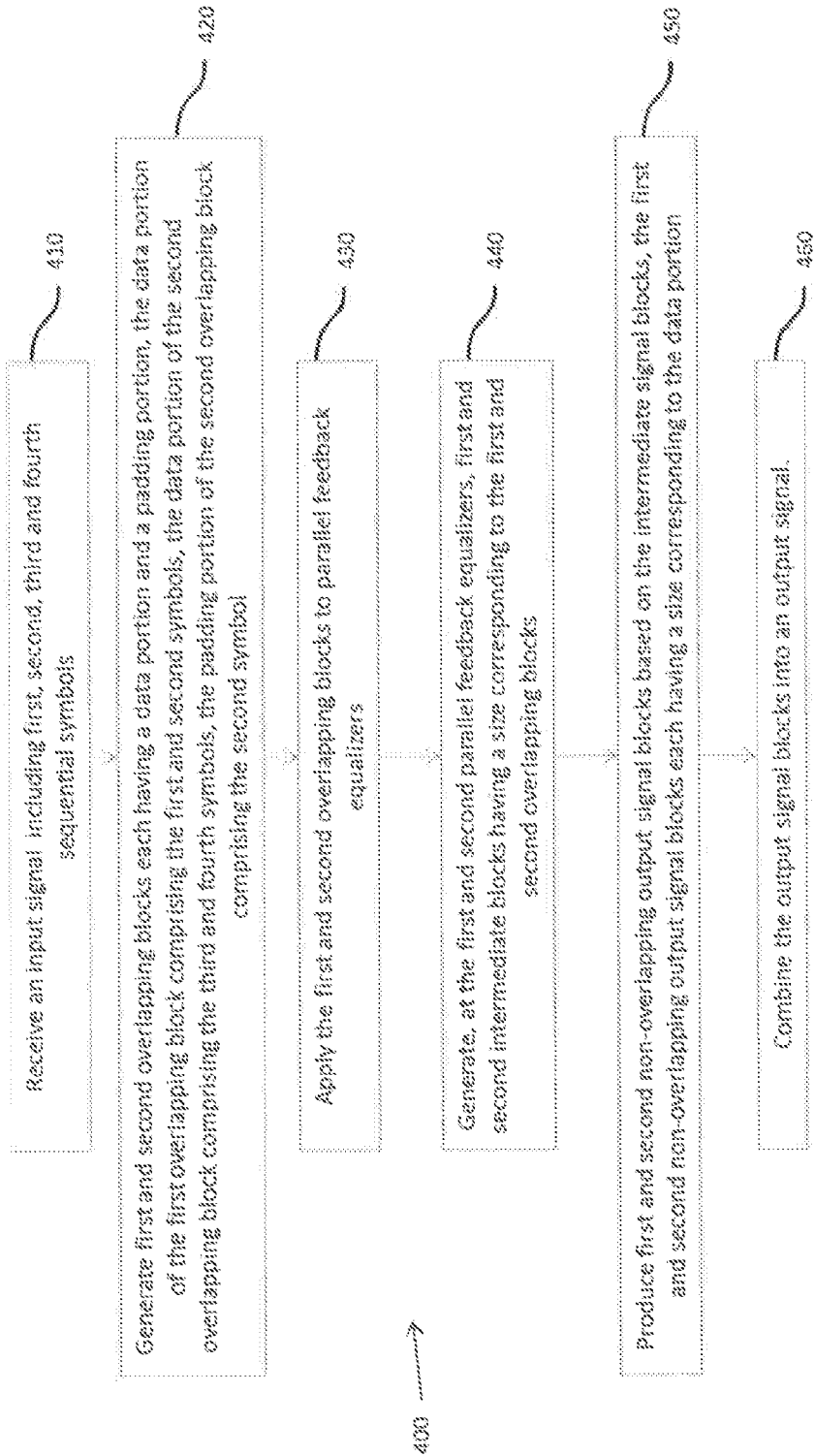
FIG. 10 is a flow chart representing a method for feedback equalization according to an embodiment of the present disclosure.

FIG. 10 shows a flowchart 400 of a feedback equalizer embodiment. In step 410 the feedback equalizer receives an input signal that includes first, second, third and fourth sequential symbols. In step 420 the feedback equalizer generates first and second overlapping blocks each having a data portion and a padding portion. The data portion of the first overlapping block comprises the first and second symbols. The data portion of the second overlapping block comprises the third and fourth symbols, and the padding portion of the second overlapping block comprises the second symbol. In step 430 the feedback equalizer applies the first and second overlapping blocks to parallel feedback equalizers. In step 440 the feedback equalizer generates, at the first and second parallel feedback equalizers, first and second intermediate blocks having a size corresponding to the first and second overlapping blocks. In step 450 the feedback equalizer produces first and second non-overlapping output signal blocks based on the intermediate signal blocks, the first and second non-overlapping output signal blocks each having a size corresponding to the data portion. In step 460 the feedback equalizer combines the output signal blocks into an output signal.

In another embodiment, a method of feedback equalization includes only steps 410, 420, 430 and 440 of FIG. 10.

In a further embodiment, a method of feedback equalization includes only steps 440, 450 and 460 of FIG. 10. In an example implementation of such a further embodiment, step 440 comprises receiving the first and second intermediate blocks and does not include the generation thereof; in another example embodiment, step 440 also includes generating the first and second intermediate blocks.

When embodiments of the present disclosure are implemented in many current communication systems, it is possible to achieve competitive advantage using coding gain to trade for other sources of power consumption within the system. As an example if an embodiment obtains 1 dB of coding gain at a cost of 100 mW, then this 1 dB can be saved in other parts of the system where it might save 150 mW. As such, the resultant system meets the same performance but saves 50 mW of power.

An alternative embodiment of the present disclosure is used to increase the performance of the system for a modest increase in power. This may be of significance in markets where the absolute performance of the system is critical, irrespective of power consumption.

Since embodiments of the present disclosure can be made to be a drop-in equivalent to a more classical DFE or DFSE, the decision whether to use this approach can be deferred to later in the design cycle. In certain cases both embodiments of the present disclosure and the classical scheme could be included and the decision upon which to use could be made after the chip returns to the lab for evaluation.

Embodiments of the present disclosure are deployed mainly in communication systems at the physical layer in the OSI model. As such, embodiments would usually, but not always, be implemented as an Application Specific Integrated Circuit (ASIC). More specifically, embodiments of the present disclosure are employed in systems such as, but not limited to: copper based Local Area Networks (LANs); Optic Fiber based Metro and Wide Area Networks (MANs and WANs); and copper based backplane systems (e.g. 802.3bj).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for feedback equalization comprising:
   receiving an input signal including first, second, third and fourth sequential symbols;
   generating first and second overlapping blocks each having a data portion and a padding portion, the data portion of the first overlapping block comprising the first and second symbols, the data portion of the second overlapping block comprising the third and fourth symbols, the padding portion of the second overlapping block comprising the second symbol;
   applying the first and second overlapping blocks one clock cycle apart to inputs of first and second parallel feedback equalizers, respectively;
   generating, at the first and second parallel feedback equalizers, first and second intermediate blocks having a size corresponding to the first and second overlapping blocks; producing first and second non-overlapping output signal blocks based on the intermediate signal blocks, the first and second non-overlapping output signal blocks each having a size corresponding to the data portion; and
   combining the output signal blocks into an output signal.

2. The method of claim 1 further comprising estimating the first overlapping block padding portion contents and the second overlapping block padding portion contents based upon the input signal.

3. The method of claim 1 wherein the padding portion of the second overlapping block comprises the first symbol.

4. The method of claim 1 further comprising:
   receiving a degraded signal from a communication channel;
   applying the degraded signal to a feed forward equalizer;
   generating the input signal by the feed forward equalizer, the feedforward equalizer having a transfer function inversely proportional to the attenuation of the communication channel.

5. A method for feedback equalization comprising:
   receiving an input signal including first, second, third and fourth sequential symbols;
   generating first and second overlapping blocks each having a data portion and a padding portion, the data portion of the first overlapping block comprising the first and second symbols, the data portion of the second overlapping block comprising the third and fourth symbols, the padding portion of the second overlapping block comprising the second symbol;
   applying the first and second overlapping block to inputs of first and second parallel feedback equalizers, respectively;
   generating, at the first and second parallel feedback equalizers, first and second intermediate blocks having a size corresponding to the first and second overlapping blocks; producing first and second non-overlapping output signal blocks based on the intermediate signal blocks, the first and second non-overlapping output signal blocks each having a size corresponding to the data portion;
   combining the output signal blocks into an output signal;

applying the received input signal to a ramp up improvement circuit;

generating, at the ramp up improvement circuit, an estimate of the first overlapping block padding portion contents and the second overlapping block padding portion contents; and applying the estimate of the first overlapping block padding portion contents and the second overlapping block padding portion contents to the first and second parallel feedback equalizers respectively to reduce the ramp up length.

6. A feedback equalizer comprising:

a capture circuit configured to receive an input signal and separate from the input signal first and a second overlapping blocks, the first and second overlapping blocks each having a padding portion and a data portion;

a first load circuit configured to apply the first overlapping block to a first parallel feedback equalizer;

a second load circuit configured to apply the second overlapping block to a second parallel feedback equalizer;

a timing circuit configured to apply the first and second overlapping blocks to the first and second parallel feedback equalizers one clock cycle apart;

the first parallel feedback equalizer generating a first intermediate block having a size corresponding to the first overlapping block;

the second parallel feedback equalizer generating a second intermediate block having a size corresponding to the second overlapping block;

a first collect circuit configured to produce a first non-overlapping output signal block from the first intermediate block, the first non-overlapping output signal block having a size corresponding to the data portion of the first non-overlapping block;

a second collect circuit configured to produce a second non-overlapping output signal block from the second intermediate block, the second non-overlapping output signal block having a size corresponding to the data portion of the second non-overlapping block; and a merge circuit configured to combine the first and second non-overlapping blocks into an output signal.

7. The feedback equalizer of claim 6 wherein the parallel feedback equalizers are decision feedback equalizers.

8. The feedback equalizer of claim 6 wherein the parallel feedback equalizers are decision feedback sequence estimators.

9. The feedback equalizer of claim 6 wherein the size of the second overlapping block is equal to the size of the first overlapping block.

10. The feedback equalizer of claim 6 wherein the size of the second data portion is equal to the size of the first data portion.

11. The feedback equalizer of claim 6 further comprising a copper based communication network interface for coupling to a copper based communication network.

12. The feedback equalizer of claim 6 further comprising an optical based communication network interface for coupling to an optical based communication network.

13. The feedback equalizer of claim 6 further comprising a backplane system interface for coupling to a backplane system.

14. A feedback equalizer comprising:

a capture circuit configured to receive an input signal and separate from the input signal first and a second overlapping blocks, the first and second overlapping blocks each having a padding portion and a data portion;

a first load circuit configured to apply the first overlapping block to a first parallel feedback equalizer;

a second load circuit configured to apply the second overlapping block to a second parallel feedback equalizer;

the first parallel feedback equalizer generating a first intermediate block having a size corresponding to the first overlapping block;

the second parallel feedback equalizer generating a second intermediate block having a size corresponding to the second overlapping block;

a first collect circuit configured to produce a first non-overlapping output signal block from the first intermediate block, the first non-overlapping output signal block having a size corresponding to the data portion of the first non-overlapping block;

a second collect circuit configured to produce a second non-overlapping output signal block from the second intermediate block, the second non-overlapping output signal block having a size corresponding to the data portion of the second non-overlapping block;

a merge circuit configured to combine the first and second non-overlapping blocks into an output signal; and a ramp up improvement circuit configured to receive the input signal, generate an improvement signal and apply the improvement signal to the parallel feedback equalizers.

15. The feedback equalizer of claim 14 wherein the ramp up improvement circuit comprises an infinite impulse response filter.

16. The feedback equalizer of claim 15 wherein the first and second parallel equalizers and the ramp up improvement circuit all have the same transfer function.

* * * * *